(12) United States Patent
Wallmeier et al.

(10) Patent No.: US 11,617,355 B2
(45) Date of Patent: Apr. 4, 2023

(54) FEEDING APPARATUS AND METHOD FOR OPERATING A FEEDING APPARATUS

(71) Applicant: Tetra GmbH, Melle (DE)

(72) Inventors: Bernd Wallmeier, Ibbenbüren (DE); Arkadiusz Soroka, Suwalki (PL); Donat Wiszniewski, Suwalki (PL)

(73) Assignee: Tetra GmbH, Melle (DE)

( * ) Notice: Subject to any disclaimer, the term of this patent is extended or adjusted under 35 U.S.C. 154(b) by 396 days.

(21) Appl. No.: 16/085,964

(22) PCT Filed: Mar. 7, 2017

(86) PCT No.: PCT/EP2017/055304
§ 371 (c)(1),
(2) Date: Sep. 17, 2018

(87) PCT Pub. No.: WO2017/157722
PCT Pub. Date: Sep. 21, 2017

(65) Prior Publication Data
US 2019/0110448 A1    Apr. 18, 2019

(30) Foreign Application Priority Data
Mar. 18, 2016    (DE) .......................... 102016105074.1

(51) Int. Cl.
*A01K 61/85*      (2017.01)
*A01K 61/00*      (2017.01)
(Continued)

(52) U.S. Cl.
CPC ................ *A01K 61/85* (2017.01); *A01K 5/02* (2013.01); *A01K 5/0225* (2013.01);
(Continued)

(58) Field of Classification Search
CPC ............................... A01K 61/80; A01K 61/85
(Continued)

(56) References Cited

U.S. PATENT DOCUMENTS 735,167 A * 8/1903 Steinberg .............. G01F 11/263
222/450
3,156,214 A * 11/1964 Denney .................. A01K 61/85
119/51.04
(Continued)

FOREIGN PATENT DOCUMENTS

DE    1908000 U    1/1965
DE    1929805 U    12/1965
(Continued)

OTHER PUBLICATIONS

International Search Repot and Written Opinion for PCT/EP2017/055304, dated May 19, 2017.
(Continued)

*Primary Examiner* — David J Parsley
(74) *Attorney, Agent, or Firm* — Merchant & Gould P.C.

(57) ABSTRACT

A feeding apparatus includes an inner compartment having a first opening; and an outer compartment having a second opening. At least one of the inner compartment and the outer compartment is configured to be movable relative to the other one of the inner compartment and the outer compartment from a first position in which the first opening is out of alignment with the second opening to a second position in which the first opening is aligned with the second opening.

24 Claims, 6 Drawing Sheets

(51) Int. Cl.
*A01K 5/02* (2006.01)
*A01K 63/00* (2017.01)
*A01K 61/80* (2017.01)

(52) U.S. Cl.
CPC ............ *A01K 5/0275* (2013.01); *A01K 61/00* (2013.01); *A01K 61/80* (2017.01); *A01K 63/006* (2013.01); *Y02A 40/81* (2018.01)

(58) Field of Classification Search
USPC .............................................. 119/51.04, 230
See application file for complete search history.

(56) References Cited

U.S. PATENT DOCUMENTS

| | | | |
|---|---|---|---|
| 3,435,804 A | 4/1969 | Orlowski | |
| 4,055,146 A | 10/1977 | Smrt | |
| 4,162,751 A * | 7/1979 | Hetland | G01F 11/24 222/293 |
| 4,296,710 A | 10/1981 | Sillers, III | |
| 4,454,943 A * | 6/1984 | Moller | B65G 33/24 198/657 |
| 5,003,925 A | 4/1991 | Roberts | |
| 5,020,699 A * | 6/1991 | Sams | G01F 11/263 222/450 |
| 5,259,533 A * | 11/1993 | Kornfein | A01K 5/0291 222/170 |
| 5,303,672 A * | 4/1994 | Morris | A01K 61/80 119/51.11 |
| 6,109,210 A * | 8/2000 | Nasser | A01K 61/85 119/51.04 |
| 6,622,655 B2 * | 9/2003 | Springett | A01K 5/0291 119/61.2 |
| 6,694,917 B1 * | 2/2004 | Wang | A01K 61/85 119/51.11 |
| 7,500,447 B2 * | 3/2009 | Vaccari | A01K 61/85 119/51.04 |
| 7,731,063 B2 * | 6/2010 | Rusch | G01F 11/24 222/306 |
| 8,276,791 B2 * | 10/2012 | Huang | B29C 45/18 222/425 |
| 9,161,514 B2 | 10/2015 | Baxter | |
| 2003/0015143 A1 | 1/2003 | Bresolin | |

FOREIGN PATENT DOCUMENTS

| | | |
|---|---|---|
| DE | 3301045 A1 | 7/1984 |
| DE | 20308802 U1 | 8/2003 |
| EP | 0514291 A2 | 11/1992 |
| EP | 0845207 A1 | 6/1998 |
| EP | 1704776 A1 | 9/2006 |
| EP | 2845474 A2 | 3/2015 |

OTHER PUBLICATIONS

Search Report for German Patent Application No. 102016105074.1, dated Oct. 21, 2016.

* cited by examiner

FEEDING APPARATUS AND METHOD FOR OPERATING A FEEDING APPARATUS

This application is a National Stage Application of PCT/EP2017/055304, filed Mar. 7, 2017, which claims benefit of Application No. 10 2016 105 074.1, filed Mar. 18, 2016 in Germany, which applications are incorporated herein by reference. To the extent appropriate, a claim of priority is made to each of the above-disclosed applications.

FIELD

Examples of the present disclosure relate to a feeding apparatus and a method for operating a feeding apparatus. Examples of the present disclosure particularly relate to an automatic feeding apparatus for feeding fish and a method for operating an automatic feeding apparatus for feeding fish.

BACKGROUND

Several feeding apparatuses are known for the automatic feeding of animals such as fish, terrarium inhabitants or the like. The automatic feeding apparatuses secure a reliable and regular feeding of fish or other inhabitants of an aquarium or terrarium, for example, during a period in which an owner of the aquarium or terrarium is absent. Different kinds of feed, such as flakes, pellets, sticks, tablets, granules, and wafers, can be used for feeding.

The commonly known feeding apparatuses for feeding fish are typically arranged above the aquarium. That is, in an area of rising steam coming from the often heated aquarium. However, like most kinds of food, feed for fish or the like can become degraded during storage, especially if the feed is not stored adequately. Specifically, moisture and light irradiation can facilitate degradation. It can therefore be desirable to protect the fish feed from moisture and/or light.

In view of the above, a feeding apparatus and a method for operating a feeding apparatus that overcome at least some of the problems in the art are beneficial. The present disclosure aims to provide a feeding apparatus that can protect feed stored in the feeding apparatus.

SUMMARY

In light of the above, a feeding apparatus and a method for operating a feeding apparatus are provided. Further aspects, advantages, and features of the present application are apparent from the dependent claims, the description, and the accompanying drawings.

According to an aspect of the present disclosure, a feeding apparatus is provided. The feeding apparatus includes an inner compartment having a first opening, and an outer compartment having a second opening. At least one of the inner compartment and the outer compartment is configured to be movable relative to the other one of the inner compartment and the outer compartment from a first position in which the first opening is out of alignment with the second opening to a second position in which the first opening is aligned with the second opening.

According to a further aspect of the present disclosure, a feeding apparatus is provided. The feeding apparatus includes an inner compartment having a first opening and at least partially including an opaque material, and an outer compartment having a second opening and at least partially including an opaque material. The inner compartment is provided coaxially with the outer compartment and is configured to be rotated with respect to the outer compartment around a horizontal axis with respect to gravity from a first position in which a surface of the inner compartment faces the second opening to a second position in which the first opening of the inner compartment faces the second opening. The first position and the second position are arranged on opposite sides with respect to an axis of the inner compartment.

According to another aspect of the present disclosure, a method for operating a feeding apparatus is provided. The feeding apparatus includes an inner compartment having a first opening and an outer compartment having a second opening. The method includes moving the inner compartment and/or the outer compartment relative to each other from a first position in which the first opening is out of alignment with the second opening to a second position in which the first opening is aligned with the second opening.

Examples are also directed at apparatuses for carrying out the disclosed methods and include apparatus parts for performing described method blocks. These method blocks may be performed by way of hardware components, a computer programmed by appropriate software, by any combination of the two or in any other manner. Furthermore, examples according to the application are also directed at methods to operate the described apparatus. It includes method blocks for carrying out the functions of the apparatus.

BRIEF DESCRIPTION OF THE DRAWINGS

So that the manner in which the above recited features of the present disclosure can be understood in detail, a more particular description of the disclosure, briefly summarized above, may be given by reference to examples. The accompanying drawings relate to examples of the disclosure and are described in the following.

DETAILED DESCRIPTION OF EXAMPLES

Reference will now be made in detail to the various examples of the disclosure, one or more examples of which are illustrated in the figures. Within the following description of the drawings, the same reference numbers refer to same components. Generally, the differences with respect to individual examples are described. The examples are provided by way of explanation of the disclosure and are not meant as a limitation of the disclosure. Further, features illustrated or described as part of one example can be used on or in conjunction with other examples to yield a further example. It is intended that the description includes such modifications and variations.

"Feed" as used herein can be understood as a feed for fish or the like. Further, a feed can be any kind of feed that can be used for feeding any kinds of animals, including those kept in aquariums, ponds and/or terrariums. Although the following description will be given with particular reference to fish feed and fish feeding apparatuses, the present disclosure is not limited thereto. In the context of the present disclosure, a "feeding apparatus" can be understood as any kind of apparatus for feeding fish, such as a feeding apparatus for feeding fish or other animals, including those kept in of aquariums, ponds and/or terrariums.

According to examples described herein, a feeding apparatus includes an inner compartment or inner chamber having a first opening, and an outer compartment or outer chamber having a second opening. The inner compartment and/or the outer compartment is configured to be moved relative to each other from a first position in which the first opening is out of alignment with the second opening to a second position in which the first opening is aligned with the second opening.

That is, a feeding apparatus can be provided having at least one compartment or chamber, which includes an opening. Further, the feeding apparatus can have a closing mechanism. The closing mechanism can be configured to close the opening of the at least one compartment. In the above example, the outer compartment including the second opening, which can be out of alignment with the first opening of the inner chamber, can be considered as the closing mechanism or as part of the closing mechanism. However, it will be understood by those of ordinary skill in the art that a closing mechanism can be formed in any suitable manner. For instance, the feeding apparatus can include a flap connected to the at least one compartment and being configured to close the opening of the at least one compartment. Specifically, any closing mechanism can be suitable that can close the opening of the at least one compartment when no feed is to be dispensed or released. It can be beneficial to use closing mechanism that do not change the outer appearance and/or shape of the feeding apparatus, such as a closing mechanism that does not employ an inward and/or outward movement of parts of the feeding apparatus, specifically with respect to the outer compartment of the feeding apparatus.

Typically, feeding apparatuses can be located in an upper area or on top of an aquarium, so that feed can be dispensed or released from the feeding apparatus using the force of gravity. Specifically, the feeding apparatus can be arranged, with respect to gravitation or the force of gravity, higher than a water level of the aquarium.

In the context of the present application, a "water level" can be understood as a level to which an aquarium or a container of the aquarium is filled with water or any other suitable liquid. Elements arranged in the aquarium, but at a position that is higher, with respect to gravity, than the water level, can be located within the aquarium or the container of the aquarium, but are not submerged in the water or the like filled in the aquarium.

The aquarium can be heated to maintain the water in the aquarium at a desired or controlled temperature. The heating of the water can lead to steam rising from the water or a surface of the water, which can correspond to the water level, to a space above the water level, specifically to the area where the feeding apparatus can be arranged. Such steam or moisture can degrade or deteriorate the feed provided or stored within the feeding apparatus. For instance, the feed can taint or coagulate when being subjected to steam or moisture. Even when the aquarium is not heated, steam can rise from the water to the space above the water level as water in the aquarium can evaporate. When practicing examples described herein, feed provided or received in the feeding apparatus can be protected from intrusion of steam or moisture. Specifically, feed can be protected from being deteriorated.

Taking into account the above references made with respect to gravitation or force of gravity, specifically indications of directions made with respect to gravitation or force of gravity, the term "horizontal direction" or "horizontal orientation" or "horizontally" can be understood to distinguish over "vertical direction" or "vertical orientation" or "vertically". That is, the "horizontal direction" or "horizontal orientation" or "horizontally" can relate to a substantially horizontal orientation e.g. of the inner compartment and the outer compartment, specifically when in use, wherein a deviation of a few degrees, e.g. up to 10° or even up to 15°, from an exact horizontal direction or horizontal orientation can be still considered as a "substantially horizontal direction" or a "substantially horizontal orientation" or "substantially horizontally". The horizontal direction can be substantially perpendicular to the force of gravity. Further, the vertical direction can be substantially parallel to the force of gravity.

According to examples described herein, substantially horizontally can be understood particularly when referring to an orientation of the inner compartment and the outer compartment, specifically to an axis of the inner compartment and/or the outer compartment, to allow for a deviation from the horizontal direction of 20° or below, e.g. of 10° or below. This deviation can be provided for example because a feeding apparatus with some deviation from the horizontal orientation might result in a feeding apparatus that can dispense or release feed more easily. Yet, the orientation of the inner compartment and the outer compartment during dispensation or release of feed can be considered to be substantially horizontal, which can be considered to be different from a vertical orientation of the inner compartment and the outer compartment, specifically of an axis of the inner compartment and/or the outer compartment.

According to examples described herein, the inner compartment and the outer compartment can have the same orientation or substantially same orientation. For instance, the inner compartment and the outer compartment can each include an axis, which can have the same orientation or substantially same orientation. Further, the orientation of the axes can be varied correspondingly, e.g. in the same or substantially same manner. That is, when the orientation of the axis of, e.g., the outer compartment is varied, the orientation of the axis of the inner compartment can be varied accordingly, and vice versa. Furthermore, the inner compartment and the outer compartment can share a common axis along which the inner compartment and the outer compartment can be orientated.

The term "substantially perpendicular" can relate to a substantially perpendicular orientation e.g., wherein a deviation of a few degrees, e.g. up to 10° or even up to 15°, from an exact perpendicular orientation can be still considered to be "substantially perpendicular". Further, the term "substantially same orientation" can relate to an orientation of two or more objects, such as the inner compartment and the outer compartment, wherein a deviation of a few degrees, e.g. up to 10° or even up to 15°, from an exactly identical orientation can be still considered to be a "substantially same orientation".

Figure 1A:
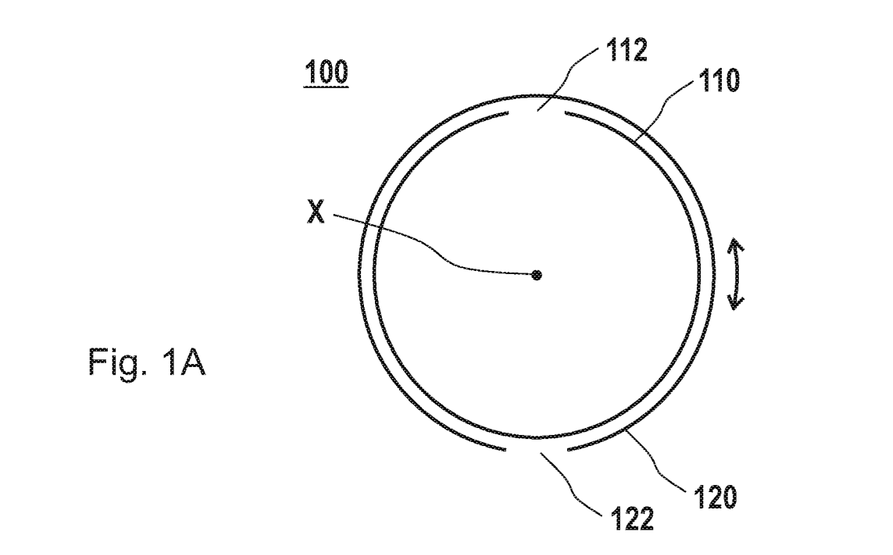
FIG. 1A shows a cross-sectional view of a feeding apparatus in a first position according to examples described herein.
Figure 1B:
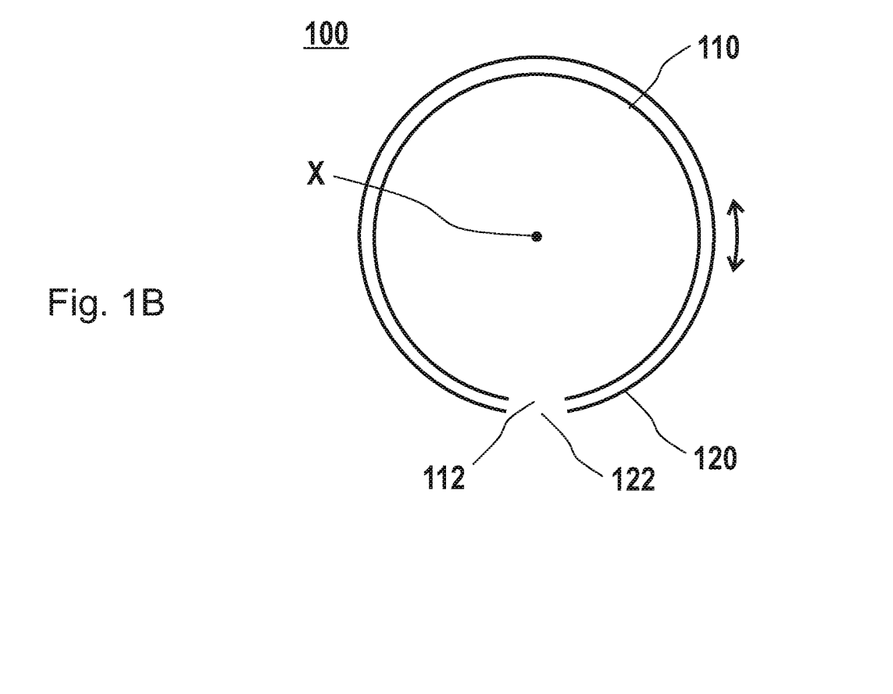
FIG. 1B shows a cross-sectional view of a feeding apparatus in a second position according to examples described herein.

FIG. 1A shows a perspective view of a feeding apparatus according to examples described herein. FIG. 1B shows a cross-sectional view of a feeding apparatus according to examples described herein.

A feeding apparatus 100 is shown that includes an inner compartment 110 or inner chamber 110 having a first opening 112, and an outer compartment 120 or outer chamber 120 having a second opening 122. The inner compartment 110 and/or the outer compartment 120 can be configured to be movable relative to each other (indicated by the arrow in FIGS. 1A and 1B) from a first position (shown in FIG. 1A) in which the first opening 112 is out of alignment with the second opening 122 to a second position (shown in FIG. 1B) in which the first opening 112 is aligned with the second opening 122. According to some examples described herein, the first opening 112 can be equal in size to the second opening 122. Further, the first opening 112 can be smaller in size than the second opening 122.

Although, in comparison of FIGS. 1A and 1B, the inner compartment 110 is depicted as being moved relative to the outer compartment 120, the outer compartment 120 can be configured to be movable relative to the inner compartment 120, or the inner compartment 110 and the outer compartment 120 can be configured to be both movable relative to each other.

In the context of the present disclosure, the term "compartment" can be understood as a separate room, section or chamber. The term "compartment" can be particularly understood as an enclosed room, section or chamber. That is, a "compartment" can be understood as a space that is delimited by enclosing walls, particularly by enclosing walls in all directions in space.

According to some examples described herein, the inner compartment 110 can be configured to receive feed. By moving the inner compartment 110 and/or the outer compartment 120 relative to each other from the first position to the second position, feed received or stored in the inner compartment 110 can be released or dispensed from the feeding apparatus 100.

When the first opening 112 and the second opening 122 are aligned with each other, feed received in the inner compartment 110 can be released through the first opening 112 and the second opening 122. Specifically, the first opening 112 and the second opening 122 can be aligned in a position, in which the first opening 112 can be arranged at a higher position with respect to gravity than the second opening 122. That is, the first opening 112 and the second opening 122 can be arranged in the vertical direction with respect to each other, specifically with the first opening 112 being arranged at a higher position than the second opening 122.

When the first opening 112 and the second opening 122 are not aligned with each other or brought out of alignment, the inner compartment 110, specifically a surface of the inner compartment 110, can be aligned with the second opening 122. That is, the second opening 122 can be closed by the inner compartment 110. When practicing examples described herein, moisture can be prevented from intruding into the inner compartment 110, specifically by closing of the second opening 122 by the inner compartment 110.

In light of the above, the first position can be considered as a closed position or closed state of the feeding apparatus. Further, the second position can be considered as an open position or open state of the feeding apparatus.

Further, according to some examples described herein, the inner compartment 110 and the outer compartment 120 can include an axis X. Specifically, the inner compartment 110 and the outer compartment 120 can be respective cylindrical members and/or tubular members. The respective cylindrical members and/or tubular members can be aligned with the axis X. For instance, the inner compartment 110 and the outer compartment 120 may be arranged with their respective longitudinal extension along the axis X.

The term "cylindrical", specifically when referring to an object, such as the inner compartment and/or the outer compartment, can be understood as referring to an object having a surface formed by points at a fixed distance from a given straight line, often referred to as axis of the cylinder. A solid enclosed by this surface and by two planes can also be considered as a cylinder. The term "tubular" as used herein can be understood as a cylinder with circular planes perpendicular to the axis and a given length along the axis.

According to some examples described herein, the outer compartment 120 can encase the inner compartment 110. That is, the outer compartment 120 can surround the inner compartment 110 and/or the inner compartment 110 can be received within the outer compartment 120. For instance, inner compartment 110 can be coaxially supported, e.g. along axis X, within the outer compartment 120.

When the first opening 112 and the second opening 122 are aligned with each other, the axis X, the first opening 112 and the second opening 122 can be arranged in the vertical direction. Specifically, the axis X, the first opening 112 and the second opening 122 can be arranged in the vertical direction with the axis X being arranged at a higher position with respect to gravity than the first opening 112, and the first opening 112 being arranged at a higher position with respect to gravity than the second opening 122.

Although the inner compartment 110 and the outer compartment 120 are shown with a common axis X, it will be understood by those of ordinary skill in the art that the inner compartment 110 and the outer compartment 120 can include separate axes. For instance, the inner compartment 110 can include a first axis and the outer compartment 120 can include a second axis. The first axis can be shifted or spaced from the second axis, e.g. in the vertical and/or horizontal direction.

Figure 2:
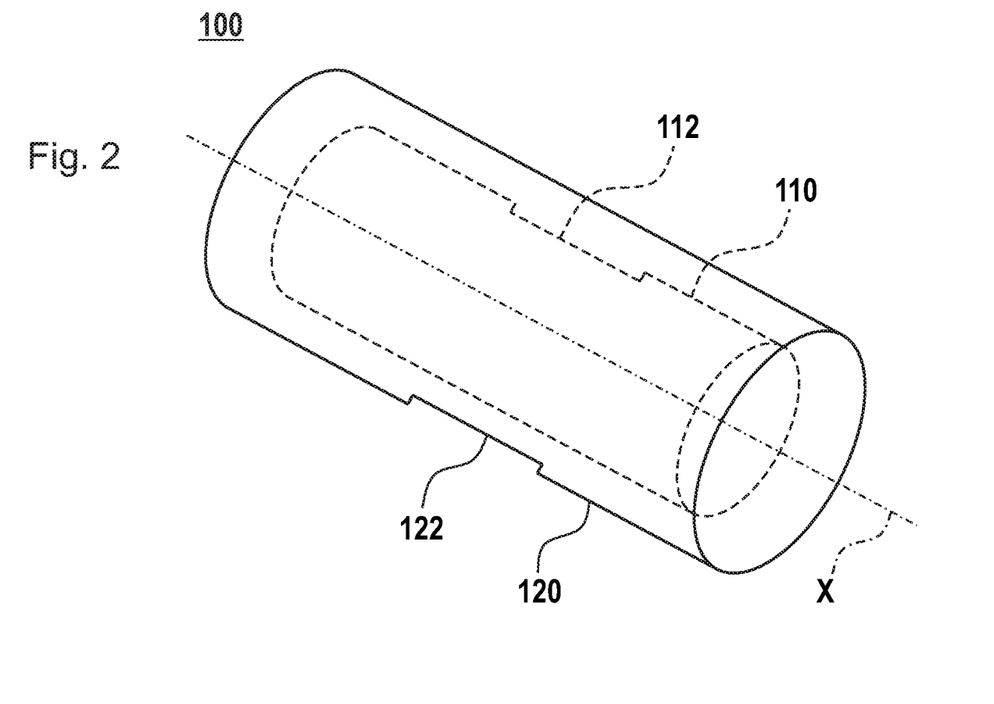
FIG. 2 shows a perspective view of a feeding apparatus according to examples described herein.

FIG. 2 shows a perspective view of a feeding apparatus according to examples described herein.

In the example of FIG. 2, the inner compartment 110 and the outer compartment 120 are shown as respective tubular members that are supported coaxially along the axis X. According to some examples described herein, the inner compartment 110 can be configured to be rotated with respect to the outer compartment 120 from the first position to the second position. Specifically, the second opening 122 can have a fixed position or be fixed with respect to the automatic feeding apparatus 100. For instance, the inner compartment 110 can be configured to be rotated with respect to the outer compartment 120 from the first position to the second position by about 180 degrees.

The axis X can be a horizontal axis. According to some examples described herein, the inner compartment 110 can be configured to be rotatable with respect to the outer compartment 120 about the horizontal axis X. When practicing examples described herein, feed, especially in the form of flakes or the like, can be stirred so that the feed can be easily dispensed or released from the feeding apparatus 100, specifically through the first opening 112. A horizontal orientation of the axis X can be particularly beneficial over a vertical orientation of the axis X to support this effect.

Specifically, the axis X, the first opening 112 and the second opening 122 can be arranged in the vertical direction in the first position and the second position. In the first position, the first opening 112, the axis X, and the second opening 122 can be arranged in the vertical direction with the first opening 112 being arranged at a higher position with respect to gravity than the axis X, and the axis X being arranged at a higher position with respect to gravity than the second opening 122. In the second position, axis X, the first opening 112 and the second opening 122 can be arranged in the vertical direction with the axis X being arranged at a higher position with respect to gravity than the first opening 112, and the first opening 112 being arranged at a higher position with respect to gravity than the second opening 122.

For instance, an opening and/or closing process, as it can be, e.g., carried out by the closing mechanism, of the feeding apparatus, i.e. a movement from the first position to the second position and/or vice versa, can be employed by a rotational movement of at least one of the inner compartment 110 and the outer compartment 120, specifically of the inner compartment 110. According to some very specific examples, the opening and/or closing process of the feeding apparatus can consist of a rotational movement of at least one of the inner compartment 110 and the outer compartment 120, specifically of the inner compartment 110.

When practicing examples described herein, opening and/or closing of the feeding apparatus can be performed without altering the outer shape of the feeding apparatus, i.e. the feeding apparatus can be constructed and/or configured to be free of parts that are moved out of or into a housing (see below) of the feeding apparatus during opening and/or closing of the feeding apparatus, e.g., for dispensing feed. Hence, a feeding apparatus having a compact shape and/or construction can be provided. For instance, a feeding apparatus according to examples described herein can employ the space delimited by the housing of the feeding apparatus for the opening and/or closing process. That is, in use, the feeding apparatus according to examples described herein does not need an additional space which has to be held free for the closing and/or opening process in the surrounding of the feeding apparatus. Further, the opening and/or closing process can be performed in practice by a movement having only one movement component. For instance, the closing and/or opening process of the feeding apparatus can employ only a rotational movement. That is, no additional efforts for moving at least one of the inner compartment 110 and the outer compartment 120 relative to each other and/or for converting, e.g. a rotational movement to a transversal movement, of least one of the inner compartment 110 and the outer compartment 120 relative to each other needs to be undertaken in practice. Hence, a feeding apparatus having an efficient construction can be provided.

According to some examples described herein, the feeding apparatus 100 can include or can be configured to provide a labyrinth seal. Specifically, the inner compartment 110 and the outer compartment 120 can be configured to provide a labyrinth seal. A "labyrinth seal" as used herein can be understood as a type of mechanical seal that provides a tortuous or elongated or extended, typically small or narrow, path to help prevent leakage or intrusion, specifically intrusion of moisture in the inner compartment 110. When practicing examples described herein, even when moisture may leak through the second opening 122 closed by the inner compartment 110 in the first position, moisture can be prevented from intruding into the inner compartment 110 by the elongated path or passage provided between the inner compartment 110 and the outer compartment 120 when the feeding apparatus 100 is in the first position. Hence, feed received in the feeding apparatus, in particular the feed received within the inner compartment, can be protected.

Figure 3:
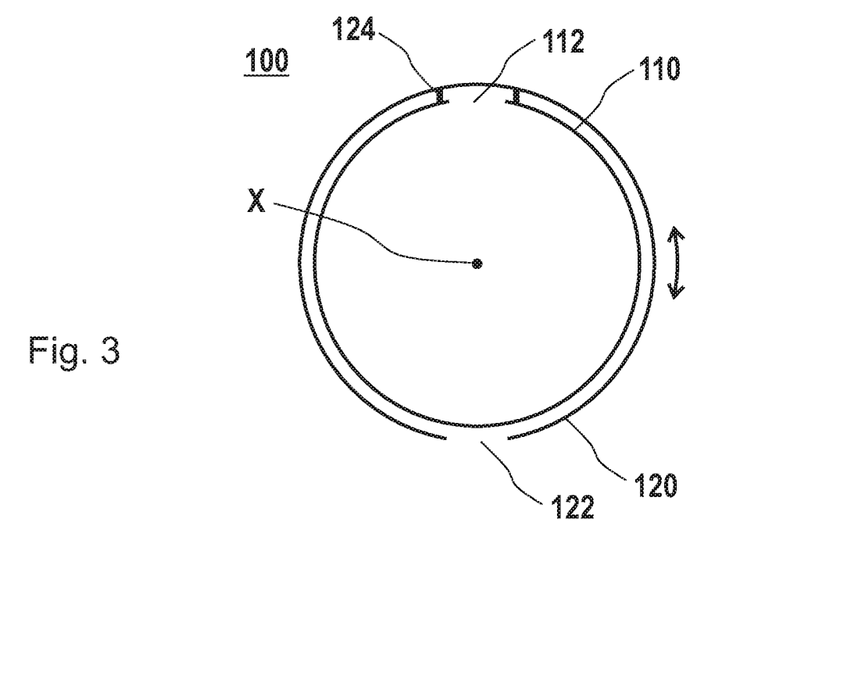
FIG. 3 shows a cross-sectional view of a feeding apparatus according to examples described herein.

FIG. 3 shows a cross-sectional view of a feeding apparatus according to examples described herein.

According to some examples described herein, a sealing member 124 can be provided. The sealing member 124 can be configured to provide a fluidly sealing of the first opening 112 in the first position. Specifically, the sealing member 124 can include a flexible material. For instance, the sealing member 124 can be a rubber and/or include flexible materials. When practicing some examples described herein, intrusion of moisture can be further prevented by providing such a sealing means.

According to some examples described herein, the sealing member 124 can be fixed to or arranged at an inner surface of the outer compartment. The inner surface of the outer compartment 120 can be a surface of the outer compartment 120 that faces the inner compartment 110. The sealing member 124 can be located at a position that is higher with respect to gravity than the feed received in the inner compartment 110. Hence, feed can be prevented from being deposited at the sealing member 124 when feed is released from the feeding apparatus 100.

Further, the sealing member 124 can be ring-shaped and/or include a shape that corresponds to a shape of the first opening 112. The sealing member 124 can be arranged or located at a position that corresponds to the position of the first opening 112 in the first position. Specifically, the sealing member 124 can conform to the first opening 112, specifically when the first opening 112 is arranged in the first position. For instance, the first opening 112 can push against the sealing member 124 when the first opening 112 is arranged in the first position. When practicing some examples described herein, the sealing member 124 can close the inner compartment in the first position to further prevent intrusion of moisture.

Although the sealing member 124 is shown as being attached to the inner surface of the outer compartment 120, specifically at a position that corresponds to the position of the first opening 110 in the first position, it will be understood that the sealing member can also be attached to an outer surface of the inner compartment 110, i.e. a surface of the inner compartment 110 facing the outer compartment 120.

Although not shown, a further sealing member can be provided that is configured to correspond to the second opening 122. This further sealing member can be arranged or located at an outer surface of the inner compartment 110, specifically at a position that corresponds to the position of the second opening 122 in the first position.

Figure 4:
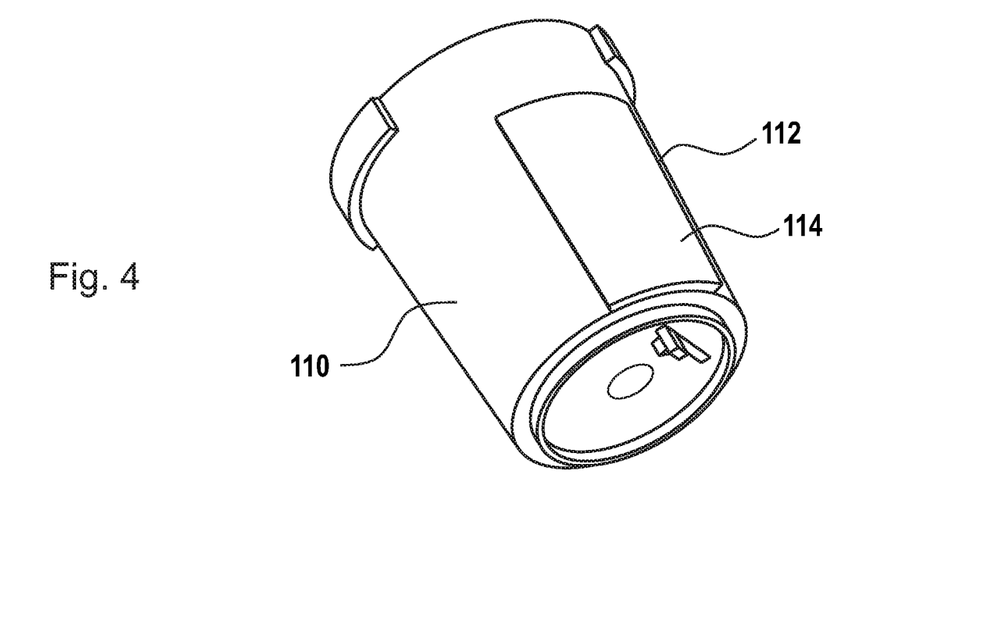
FIG. 4. shows a perspective view of an inner compartment of a feeding apparatus according to examples described herein.

According to examples described herein, the feeding apparatus 100 can include a flap 114. For instance, the flap 114 can be flexible, such as a flexible flap 114. As shown in FIG. 4, the flap can be provided in an area corresponding to the first opening 112. For instance, the flap 114 can be fixed or hinged at the inner chamber 110 so that the flap 114 can be configured to selectively close and open the first opening 112. When practicing examples described herein an intrusion of moisture and/or light into the feed apparatus 100, specifically the inner compartment 110, can be prevented.

In light of the above, the flap 114 can provide a closing mechanism as described herein. Specifically, the flap 114 can selectively close the first opening 112. That is, the feeding apparatus 100 can be closed and/or intrusion of moisture and/or light can be prevented when the outer compartment 120 is not provided.

Figure 5A:
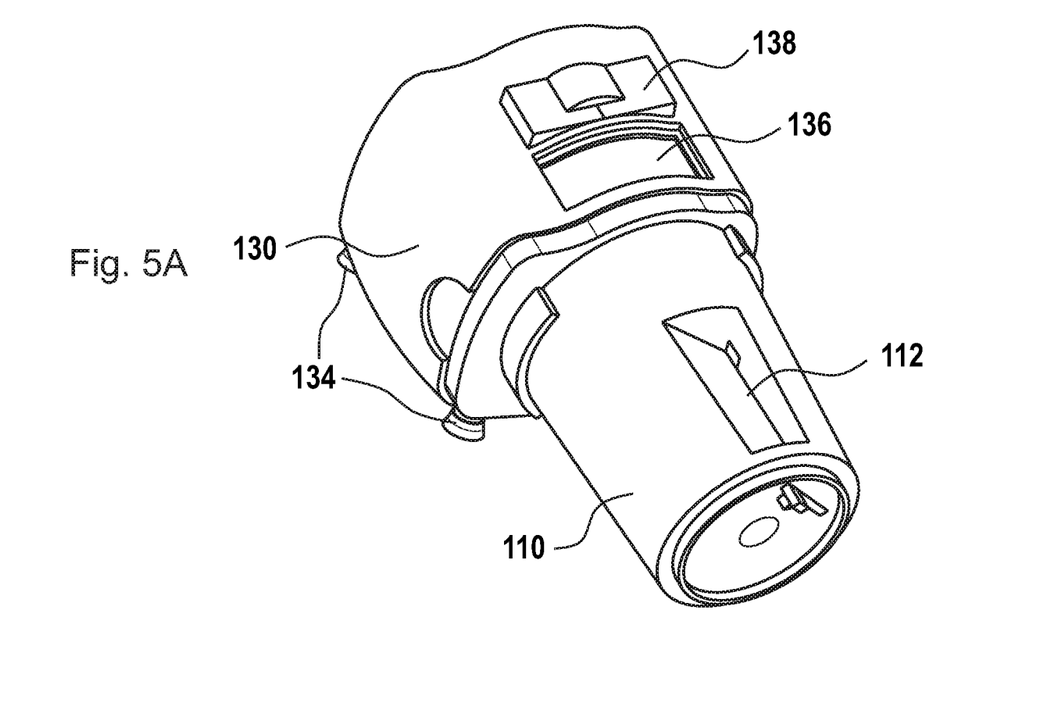
FIGS. 5A and 5B show schematic views of a feeding apparatus according to examples described herein.
Figure 5B:
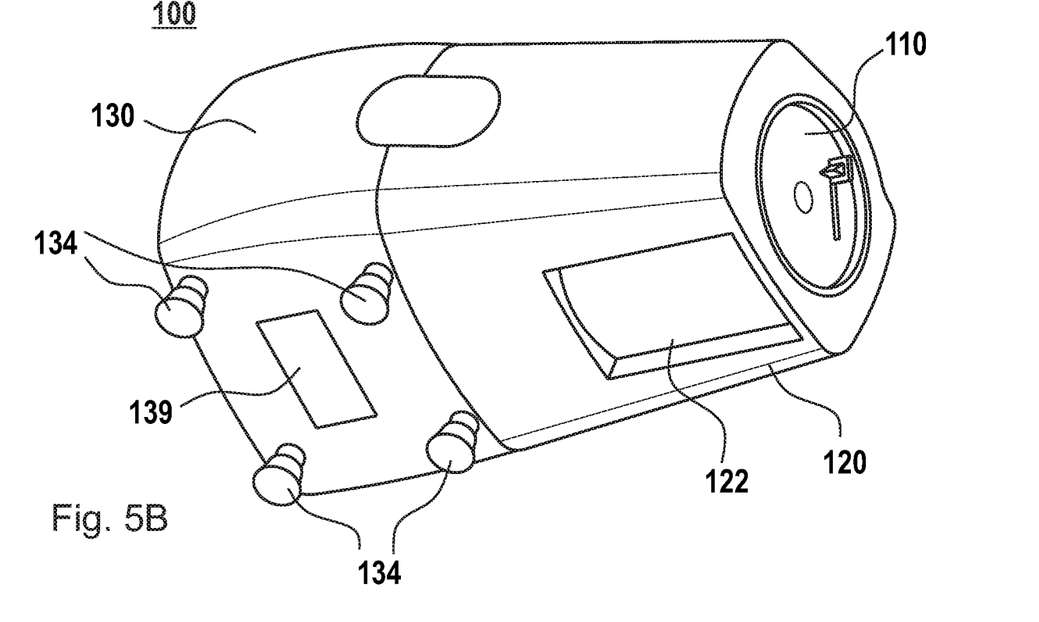

FIGS. 5A and 5B show schematic views of a feeding apparatus according to examples described herein.

According to some examples described herein, the feeding apparatus 100 can include a housing 130. As shown in FIG. 5A, the inner compartment 110 can be attached to the housing 130. Specifically, the housing 130 can house or accommodate a motor (not shown). The motor can be configured to move the inner compartment 110 and/or the outer compartment 120 relative to each other from the first position to the second position. For instance, the motor can be configured to rotate the inner compartment 100 relative to the outer compartment 120 from the first position to the second position and vice versa. Specifically, the motor can be an electric motor and/or perform a rotation of 180° in a rotational direction from the first position to the second position and a further rotation of 180° in the rotational direction from the second position to the first position.

Furthermore, the housing 130 can accommodate or house a controller (not shown) for controlling the operation of the feeding apparatus 100. The controller can be connected to a display 136 and/or an input device 138. The display 136 can be configured to display information regarding the operation of the feeding apparatus to a user. While the input device 138 can be configured to receive input from the user, the input received from the user can be displayed or visualized on the display 136.

The housing 130 can include further elements helpful for the operation and/or installation of the feeding apparatus 100. For instance, the housing 130 can include attachment elements for attaching the housing 130 to an aquarium or to a container of an aquarium. Furthermore, the housing can include a waterproof material and/or can include a plastic material such as ABS (acrylonitrile butadiene styrene), SAN (styrene-acrylonitrile resin), and/or SEBS (styrene ethylene butylene styrene). According to some examples described herein, a battery case 139 is provided. Specifically, the housing 130 can include the battery case 139. The battery case 139 can be provided for having batteries provided therein for ensuring an operation of the feeding apparatus 100 independent from the main supply.

Furthermore, the housing 130 can be provided with elements for arranging the feeding apparatus relative to the aquarium. For instance, the housing 130 can include positioning elements 134, specifically for positioning the feeding apparatus 100. The positioning elements 134 can be, e.g., pedestals for placing the feeding apparatus on a structure located within or next to the aquarium. When placing the feeding apparatus 100 with the positing elements 136 next to the aquarium, it can be beneficial to arrange the first opening 112 and/or the second opening 122 above the water filled in the aquarium, specifically above the water level, so that the feed released from the feeding apparatus 100 can easily drop into the water.

As shown in FIG. 5B, the outer compartment 120 can be attached to the housing 130. Specifically, the outer compartment 120 can be flush with the housing 130. That is, an outer surface of the outer compartment 120 can conform to an outer surface of the housing 130, at least at an intersection of the outer compartment 120 and the housing 130. The outer compartment can include an inner surface, which faces the inner compartment 110, corresponding to the outer surface of the inner compartment 110 and an outer surface, which is opposite to the inner compartment 110, corresponding to the outer surface of the housing 130.

When feed or the like is subjected to artificial and/or natural light, such as light emitted from a lamp or sunlight, nutritive substances in the feed can deteriorate. Specifically, vitamins can decompose. The quality of the feed can deteriorate. According to some examples described herein, the outer compartment 120 can include at least partially an opaque material, specifically including ABS (acrylonitrile butadiene styrene), SAN (styrene-acrylonitrile resin), and/or SEBS (styrene ethylene butylene styrene) being made opaque. When practicing examples described herein, the feed received in the feeding apparatus 100 can be prevented from being subjected to light and/or light can be blocked before the light receives the feed. The quality of the feed can be maintained during storage of the feed in the feeding apparatus 100. Further, the inner compartment 110 can include at least partially an opaque material, for instance including ABS (acrylonitrile butadiene styrene), SAN (styrene-acrylonitrile resin), and/or SEBS (styrene ethylene butylene styrene) being made transparent.

Figure 6:
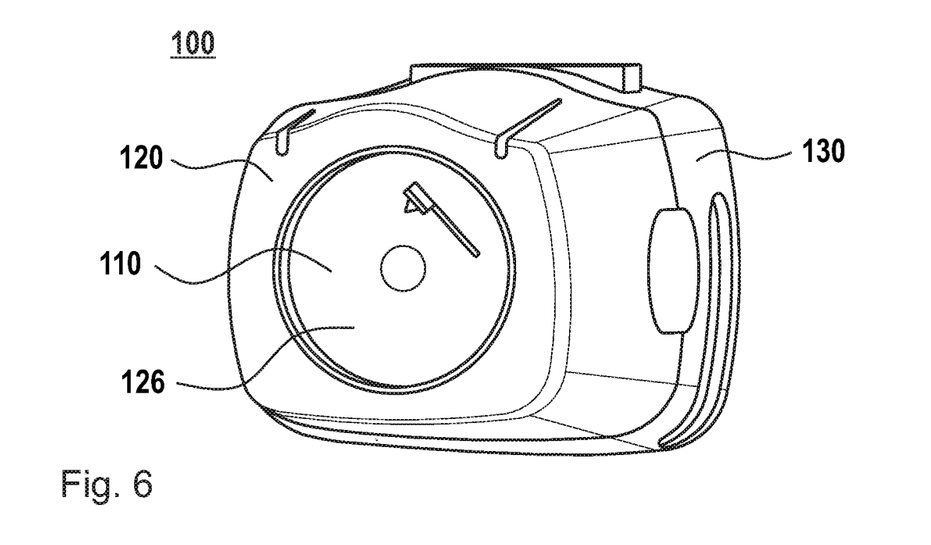
FIG. 6 shows a schematic view of a feeding apparatus according to examples described herein.

FIG. 6 shows a schematic view of a feeding apparatus according to examples described herein.

As shown in FIG. 6, the outer compartment 120 can include a viewing window 126 or viewing opening 126. The viewing window 126 can be configured so that the inner compartment 110 or at least a part of the inner compartment 110 can be viewed through and/or is exposed by the viewing window 126. Specifically, a front side of the inner compartment 110 can be viewed through and/or is exposed by the viewing window 126.

Further, the inner compartment 110 can at least partially include a transparent or an at least partially transparent material. According to examples described herein, at least one of the inner compartment 110 and the outer compartment 120 can be configured to at least partially provide visual feed inspection. For instance, the inner compartment 100 can at least partially include a transparent material, for instance including ABS (acrylonitrile butadiene styrene), SAN (styrene-acrylonitrile resin), and/or SEBS (styrene ethylene butylene styrene) being made transparent. Further, the viewing window can expose the part or a portion of the part of the inner compartment 110 that includes the transparent material. When practicing examples described herein, a filling level of feed received in the inner compartment 110 can be inspected.

According to examples described herein, at least one of the inner compartment 110 and the outer compartment 120 can be configured to at least partially block light. Specifically, the inner compartment 110 can include a material that is at least partially transparent for visible light while a material of the outer compartment 120 is opaque for, e.g., ultraviolet light. When practicing examples described herein, the feed received in the inner compartment 110 can be visually inspected while the feed is protected from ultraviolet light, which would normally deteriorate the quality of the feed. Furthermore, the outer compartment 120 can at least partially include a transparent or an at least partially transparent material.

Figure 7A:
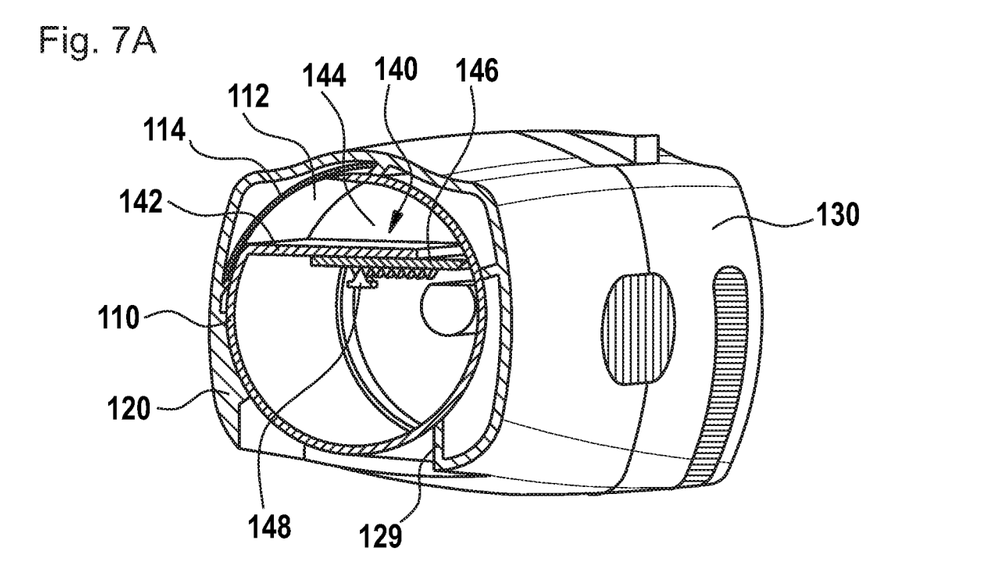
FIGS. 7A and 7B show perspective views of a feeding apparatus according to examples described herein.
Figure 7B:
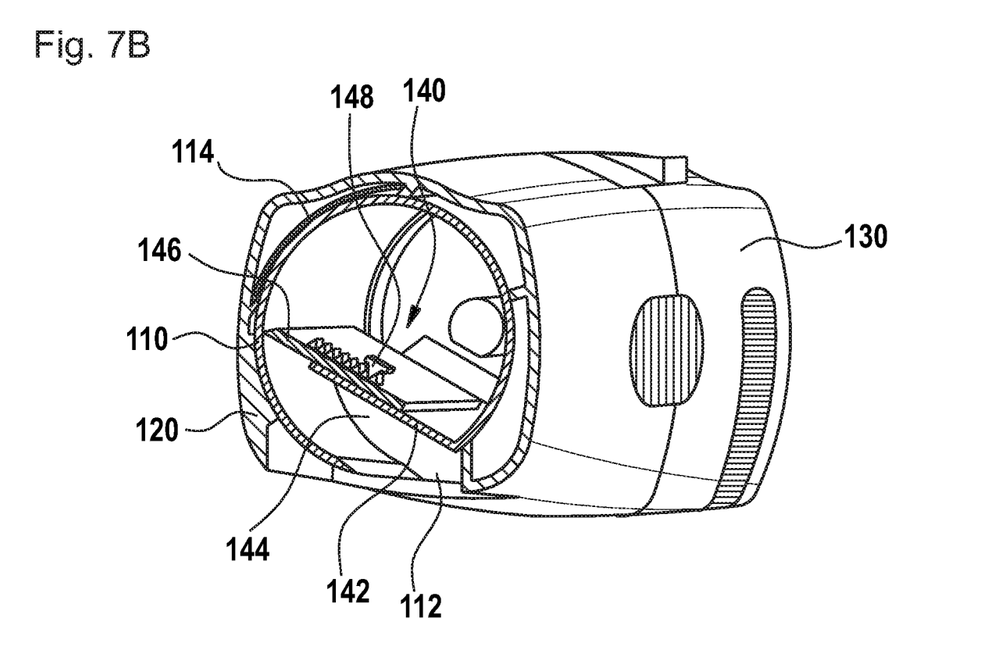
Figure 8A:
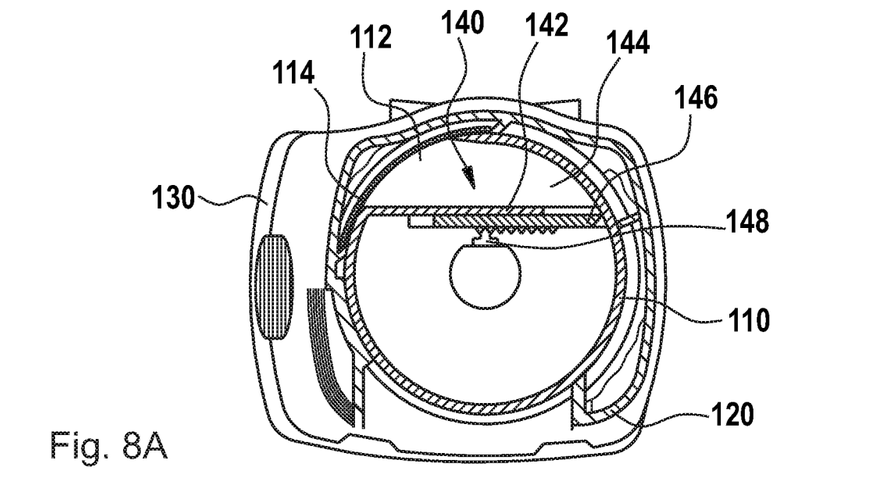
FIGS. 8A and 8B show schematic plan views of a feeding apparatus according to examples described herein.
Figure 8B:
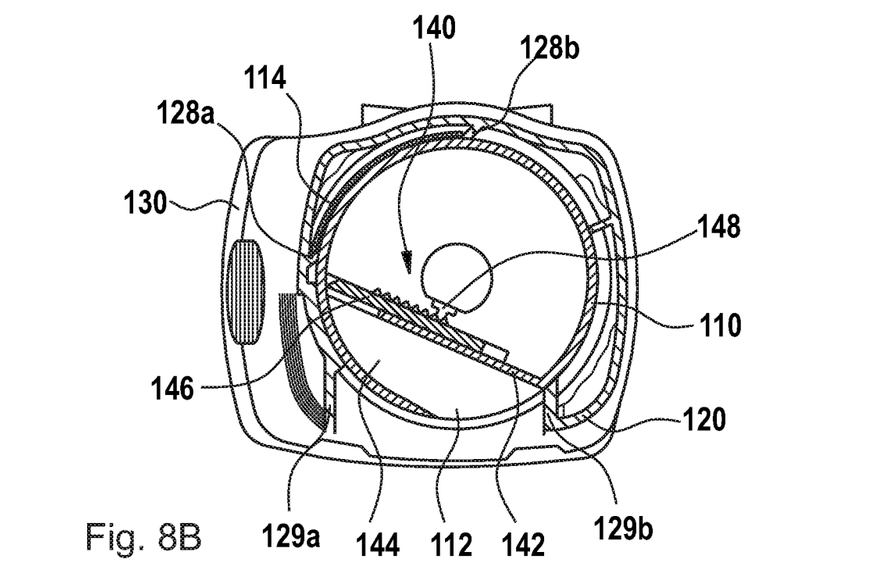

FIGS. 7A and 7B show perspective views of a feeding apparatus according to examples described herein, particularly perspective views of the interior of the feeding apparatus 100. FIGS. 8A and 8B show schematic plan views of a feeding apparatus according to examples described herein. Specifically, FIGS. 7A and 8A show the feeding apparatus 100 with the first opening 112 in the first position and FIGS. 7B and 8B show the feeding apparatus 100 with the first opening 112 in the second position, respectively.

According to examples described herein, the feeding apparatus 100 can include a metering unit 140. The metering unit 140 can be used to meter a dose of feed that is released by the feeding apparatus 100, e.g. per revolution. As shown in the examples of FIGS. 7A, 7B, 8A and 8B, the metering unit 140 can include a partitioning wall 142. The partitioning wall 142 can be provided within the inner compartment to partition the inner compartment 110 in a main compartment, in which the feed can be received, and a pre-compartment 144, in which the metered feed can be partitioned. For instance, the partition wall can extend from a border of the first opening into the inner compartment 110, leaving a passage from the main compartment to the pre-compartment 144 open, through which feed received in the inner compartment 110, specifically in the main compartment, can pass to the pre-compartment 144 when the inner compartment 110 is moved or rotated.

For instance, the inner compartment 110 can have a size equal to or more than about 50 ml, particularly equal to or more than about 75 ml, and/or equal to or less than about 200 ml, particularly equal to or less than about 150 ml, typically about 95 ml. The pre-compartment 144 can have a size equal to or more than about 2 ml, particularly equal to or more than about 5 ml, and/or equal to or less than about 20 ml, particularly equal to or less than about 10 ml, typically about 8 ml. Specifically, the pre-compartment 144 can have a size of equal to or more than about 2%, particularly equal to or more than about 5%, and/or equal to or less than about 20%, particularly equal to or less than about 10%, typically about 8% of the inner compartment 110. That is, the pre-compartment 144 can occupy the above percentage of the inner compartment whereas the main compartment can be considered as occupying substantially the remaining size of the inner compartment 110 taking into account the size of the, e.g., partitioning wall 142 etc.

According to examples described herein, the metering device 140 can further include an adjustment element 146. The adjustment element 146 can be used to adjust the amount of feed that can pass into the pre-chamber per revolution. For instance, the adjustment element 146 can be a moveable plate that can be moved into and out of the passage to decrease or increase the size of the passage. That is, the amount of feed released from the feeding apparatus 100 can be adjusted.

The adjustment element 146 can be connected to a lever element 148. The lever element 148 can be used to control the adjustment element 146, specifically to control the amount of feed that is released by the feeding apparatus 110 per revolution. For instance, the lever element 148 can be connected to the adjustment element 146. Further, the lever element 148 can be provided through the inner compartment 110 and/or the outer compartment 120 so that the lever element can be accessible from an exterior of the feeding apparatus to e.g., user input. That is, the adjustment of the amount of feed released from the feeding apparatus 100 can be controlled.

Further, the amount of feed released by the feeding apparatus 100 can be controlled by the controller. For instance, a user can adjust the amount of feed released from the feeding apparatus 100, specifically per revolution, via the input device 136. That is, a desired amount of feed released from the feeding apparatus 100 can be set via the input device. The input can be forwarded to the controller, which can be configured for controlling the metering unit 140.

According to examples described herein, the flap 114 can be located at a position that corresponds to a position of the first opening 112 in the first position. Specifically, the flap 114 can conform to the first opening 112, in particular when first opening 112 is arranged in the first position. For instance, the flap 114 can be formed larger than the first opening 112. Further, the flap 114 can cover the first opening 112 when the first opening 112 is arranged in the first position. When practicing some examples described herein, the flap 114 can close the inner compartment in the first position to prevent intrusion of moisture.

As shown in the examples of FIGS. 7A, 7B, 8A and 8B, flap 114 can be supported in the outer compartment 120. For instance, the outer compartment 120 can include support protrusions 128a, 128b for supporting the flap 114. Specifically, the outer compartment 120 can include a first support protrusion 128a provided at one side of the first opening 112, when the first opening 112 is arranged in the first position, and a second support protrusion 128b provided at the opposite side of the first opening 112, when the first opening 112 is arranged in the first position. According to examples described herein, the flap 114 can be fixed to the outer compartment 120, specifically to the support protrusions 128a, 128b.

Further, the flap 114 can be formed as a circular segment having a larger radius or a little bit larger radius than a distance from the axis X to an edge or the edges of the first compartment 110 delimiting the first opening. According to examples described herein, the flap 114 can conform to the first opening 112, specifically when the first opening 112 is arranged in the first position. For instance, the first opening 112 can push against the flap 114 when the first opening 112 is arranged in the first position. When practicing some examples described herein, the flap 114 can close the inner compartment 110 in the first position to prevent intrusion of moisture. Specifically, the flap 114 can be configured to be moveable in the outer compartment 120, typically in the vertical direction. When practicing some examples described herein, the flap 114 can be pushed by force of gravity to the first opening 112 when the first opening 112 is arranged in the first position, closing the first opening 112.

According to examples described herein, the flap 114 can be in an abutting contact with the inner compartment 110. For instance, when the flap 114 is provided to be flexible, the flap 114 can exert a force against the inner compartment 110. That is, the flap 114 can be configured to exert a force against the inner compartment 110, i.e. by a proper shape, size and/or arrangement. For instance, the flap 114 can be pre-loaded, e.g. between the support protrusions 128a, 128b, exerting a force against the inner compartment 110. Specifically, providing the flap 114 with pre-load in the outer compartment 120, the flap can be fixed to the outer compartment 120, specifically to the support protrusions 128a, 128b. Accordingly, when practicing some examples described herein, the inner compartment 110, specifically the first opening 112 when in the first position, can be closed due to the flexibility of the flap 114 and/or the force which the flap 114 exerts on the inner compartment 110.

Further, the outer compartment 120 can include protrusions 129 that can be configured to conform to an outer surface of the inner compartment 110. That is, the outer compartment 120 and/or parts of the outer compartment 120 can be in an abutting contact with the inner compartment 110. For instance, the protrusions 129 can include a first protrusion 129a and/or a second protrusion 129b. The first protrusion 129a and/or the second protrusion 129b can be arranged adjacent to the second opening 122. Specifically, the first protrusion 129a and/or the second protrusion 129b can delimit the second opening 122, i.e. can be sidewalls of the second opening 122. When practicing some examples described herein, the first protrusion 129a and/or the second protrusion 129b can provide a sealing effect to prevent intrusion of moisture and/or contribute to the labyrinth seal as discussed herein. Specifically, the first protrusion 129a and/or the second protrusion 129b can be beneficial to prevent leakage or intrusion, specifically intrusion of moisture, through the second opening 122, particularly when the first opening 112 and the second opening 122 are out of alignment with each other.

A method for operating a feeding apparatus 100, which includes an inner compartment 110 having a first opening 112 and an outer compartment 120 having a second compartment 120 is provided. The inner compartment 100 and/or the outer compartment 120 can be moved relative to each other from a first position in which the first opening is out of alignment with the second opening to a second position in which the first opening is aligned with the second opening. Specifically, the inner compartment 110 can be rotated from the first position to the second position, e.g. by equal to or more than about 150°, particularly equal to or more than about 180°, and/or equal to or less than about 270°, particularly equal to or less than about 240°, typically about 210°.

According to examples described herein, the inner compartment 100 and/or the outer compartment 120 can be moved relative to each other from the second position to the first position. Specifically, the inner compartment 110 and/or the outer compartment 120 can be rotated relative to each other from the second position to the first position around axis X, e.g. by 180°. That is, the inner compartment 110 and/or the outer compartment 120 can be rotated relative to each other from the first position via the second position back to the first position. According to examples described herein, this revolving motion can be done in one rotational direction or a change of the rotational direction can occur. For instance, the inner compartment 100 and/or the outer compartment 120 can be rotated relative to each other from the first position to the second position around axis X in a clockwise or counterclockwise direction. Further, the inner compartment 100 and/or the outer compartment 120 can be rotated relative to each other from the second position to the first position around axis X either in the same direction as before or in an opposite direction. That is, if the inner compartment 100 and/or the outer compartment 120 have been rotated relative to each other from the first position to the second position in the clockwise direction, the inner compartment 100 and/or the outer compartment 120 can be rotated relative to each other from the second position to the first position in either the clockwise direction or the counterclockwise direction, and vice versa. That is, the first opening 110 can be moved continuously through the second opening 120.

Further, the inner compartment 100 and/or the outer compartment 120 can be moved relative to each other from the second position to the first position after a duration t. That is, after moving the inner compartment 100 and/or the outer compartment 120 relative to each other to the second position, the inner compartment 100 and/or the outer compartment 120 can be configured to stay in the second position for the duration t. Alternatively, the inner compartment 100 and/or the outer compartment 120 can be moved relative to each other continuously for one revolution. Specifically, the moving of the inner compartment and/or the outer compartment relative to each other from the first position to the second position and from the second position to the first position is a revolving movement. For instance, if the inner compartment 100 and/or the outer compartment 120 are moved continuously during one revolution, the duration of one revolution can be about 3 sec to about 60 sec, specifically about 5 sec to about 30 sec, typically about 8 sec to about 20 sec.

While the foregoing is directed to examples of the disclosure, other and further examples of the disclosure may be devised without departing from the basic scope thereof, and the scope thereof is determined by the claims that follow.

The invention claimed is:

1. A feeding apparatus, comprising:
   an inner compartment for holding feed; the inner compartment having a first opening and an outer surface; and
   an outer compartment having a second opening, the second opening extending less than a length of the outer compartment, the outer compartment having an inner surface opposed to the outer surface of the inner compartment;
   wherein at least one of the inner compartment and the outer compartment is movable relative to the other one of the inner compartment and the outer compartment from a first position in which the first opening is out of alignment with the second opening to a second position in which the first opening is aligned with the second opening; and
   a sealing member to provide a fluid sealing of the first opening in the first position; the sealing member being located at a position that is higher with respect to gravity than feed within the inner compartment; the sealing member surrounding an entire perimeter of the first opening to provide a seal around the entire perimeter between and against the inner surface and outer surface.

2. The feeding apparatus according to claim 1, wherein the at least one of the inner compartment and the outer compartment is movable relative to the other one of the inner compartment and the outer compartment along and/or around a horizontal axis.

3. The feeding apparatus according to claim 1, wherein the at least one of the inner compartment and the outer compartment is rotatable relative to the other one of the inner compartment and the outer compartment.

4. The feeding apparatus according to claim 1, wherein the inner compartment is rotatable relative to the outer compartment about a horizontal axis.

5. The feeding apparatus according to claim 1, wherein the inner compartment is rotatable relative to the outer compartment from the first position to the second position, by about equal to or more than about 120°.

6. The feeding apparatus according to claim 1, wherein the outer compartment encases the inner compartment, and/or wherein the inner compartment is coaxially supported within the outer compartment.

7. The feeding apparatus according to claim 1, wherein the sealing member includes a flexible material, is ring-shaped, and/or is fixed to an inner surface of the outer compartment, wherein the sealing member is located at a position corresponding to a position of the first opening in the first position.

8. The feeding apparatus according to claim 1, wherein at least one of the inner compartment and the outer compartment at least partially block light.

9. The feeding apparatus according to claim 1, wherein at least one of the inner compartment and the outer compartment at least partially provides visible feed inspection.

10. The feeding apparatus according to claim 1, further comprising a battery case.

11. The feeding apparatus according to, claim 1, further comprising a metering unit.

12. The feeding apparatus according to claim 1, wherein the inner compartment is rotatable relative to the outer compartment from the first position to the second position, by about equal to or more than about 180°.

13. The feeding apparatus according to claim 1, wherein the inner compartment is rotatable relative to the outer compartment from the first position to the second position, by about equal to or less than about 270°.

14. The feeding apparatus according to claim 1, wherein the inner compartment is rotatable relative to the outer compartment from the first position to the second position, by about equal to or less than about 300°.

15. The feeding apparatus according to claim 1, wherein the inner compartment is rotatable relative to the outer compartment from the first position to the second position, by about 210°.

16. The feeding apparatus according to claim 1 further including feed within the inner compartment.

17. A feeding apparatus, comprising:
an inner compartment having a first opening and at least partially including an opaque material; and
an outer compartment having a second opening and at least partially including an opaque material, the second opening being the only opening in the outer compartment and extending less than a length of the outer compartment;
wherein the inner compartment is coaxial with the outer compartment and is rotatable with respect to the outer compartment around a horizontal axis with respect to gravity from a first position in which a surface of the inner compartment faces the second opening to a second position in which the first opening of the inner compartment faces the second opening; and
a sealing member to provide a fluid sealing of the first opening in the first position, the sealing member surrounding an entire perimeter of the first opening to provide a seal around the entire perimeter between and against an outer surface of the inner compartment and inner surface of the outer compartment;
wherein the first position and the second position are arranged on opposite sides with respect to an axis of the inner compartment.

18. A method for operating a feeding apparatus comprising an inner compartment having a first opening and an outer compartment having a second opening, the method comprising:
moving the inner compartment and/or the outer compartment relative to each other from a first position in which the first opening is out of alignment with the second opening to a second position in which the first opening is aligned with the second opening, the second opening extending less than a length of the outer compartment;
the feeding apparatus further comprising a seal member to provide a fluid sealing of the first opening in the first position; the sealing member being located at a position that is higher with respect to gravity than feed within the inner compartment; the sealing member surrounding an entire perimeter of the first opening to provide a seal around the entire perimeter between and against an outer surface of the inner compartment and inner surface of the outer compartment.

19. The method according to claim 18, further comprising:
moving the inner compartment and/or the outer compartment relative to each other from the second position to the first position, wherein the moving of the inner compartment and/or the outer compartment relative to each other from the first position to the second position and from the second position to the first position is a revolving movement.

20. A feeding apparatus, comprising:
an inner compartment having a first opening;
an outer compartment having a second opening, the second opening extending less than a length of the outer compartment;
wherein at least one of the inner compartment and the outer compartment is movable relative to the other one of the inner compartment and the outer compartment from a first position in which the first opening is out of alignment with the second opening to a second position in which the first opening is aligned with the second opening; and
a sealing member to provide a fluid sealing of the first opening in the first position; wherein the sealing member includes a flexible material fixed to an inner surface of the outer compartment; the sealing member being located at a position corresponding to a position of the first opening in the first position; the sealing member surrounding an entire perimeter of the first opening to provide a seal around the entire perimeter between and against an outer surface of the inner compartment and inner surface of the outer compartment.

21. The feeding apparatus according to claim 20, wherein at least one of the inner compartment and the outer compartment at least partially provides visible feed inspection.

22. The feeding apparatus according to claim 20, further comprising a battery case.

23. The feeding apparatus according to, claim 20, further comprising a metering unit.

24. The feeding apparatus according to claim 20, wherein the inner compartment is rotatable relative to the outer compartment from the first position to the second position, by about equal to or less than about 270°.

* * * * *